July 15, 1924.
A. BOGDÁNFFY
1,501,700
FEEDING ATTACHMENT FOR CROWN CORK MAKING MACHINES
Filed June 19, 1916
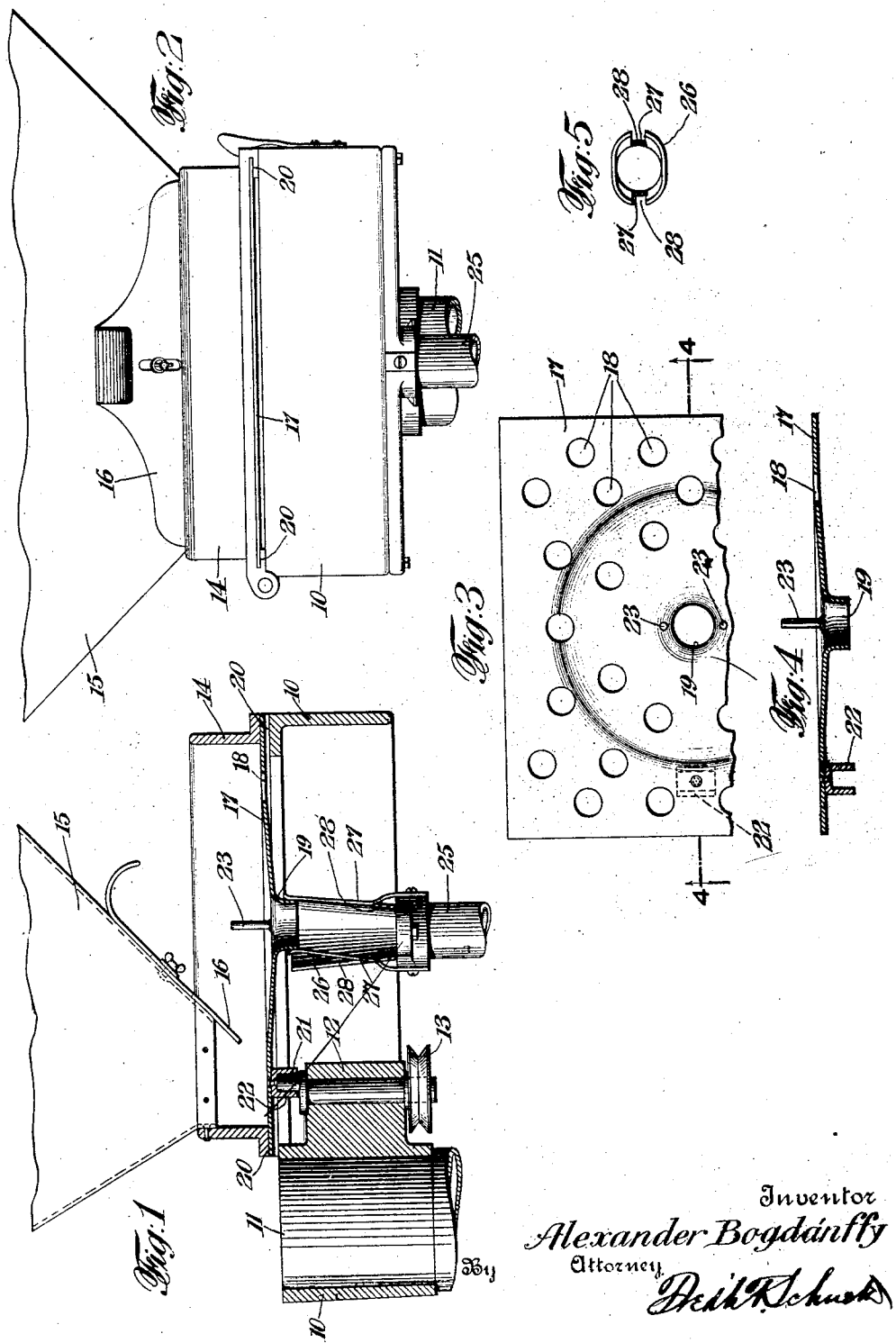
Inventor
Alexander Bogdánffy
Attorney Patented July 15, 1924.

1,501,700

UNITED STATES PATENT OFFICE.

ALEXANDER BOGDÁNFFY, OF BROOKLYN, NEW YORK.

FEEDING ATTACHMENT FOR CROWN-CORK-MAKING MACHINES.

Application filed June 19, 1916. Serial No. 104,525.

*To all whom it may concern:*

Be it known that I, ALEXANDER BOG-DÁNFFY, a subject of the King of Hungary, and resident of Brooklyn, in the county of Kings and State of New York, have invented certain new and useful Improvements in Feeding Attachments for Crown-Cork-Making Machines, of which the following is a specification.

The invention relates to machines used in connection with the manufacture of bottle, jar, can and the like closures of the cap variety, including those termed "crown corks"; and more particularly, to a hopper or feeding device for the sealing disks of cork or similar material.

The invention has for its object to properly deliver, from a mass of disks placed in the hopper, individual disks into a feed chute wherein they are suitably stacked and then transported one after the other to the assembling elements of the cap-making machines. The invention has for a further object to provide simple means for effecting the separation of chips and broken disks and of suitably stacking in efficient manner the usable ones, all jamming and misplacing of the disks being obviated. Moreover, the apparatus is so designed that surplus disks remaining in the hopper may be conveniently and readily removed.

The nature of the invention will be best understood when described in connection with the accompanying drawings, in which—

Fig. 1 is a vertical section thru the apparatus, and Fig. 2 a side elevation.

Fig. 3 is a plan of a portion of the reciprocatory plate or screen, and Fig. 4 a vertical section therethru taken on the line 4—4, Fig. 3.

Fig. 5 is a plan of the chute with the reciprocatory plate removed.

Similar characters of reference designate corresponding parts thruout the several views.

Referring to the drawings, 10 designates a suitable frame mounted on a standard 11 or the like, which provides a bearing 12 for a driving pulley 13. To the top of frame 10 is hingedly secured a receptacle or retainer 14 for the cork disks or the like (not shown), which are delivered thereto at one end thru a hopper 15 attached to the said receptacle. The said hopper is provided with an adjustable slide 16 to vary the feed; and by securing the said hopper at one end of the receptacle, the disks will be disposed in a more or less thin layer over a plate or screen 17 which forms the bottom of the receptacle, and jamming of the disks is thereby prevented. Furthermore, in thus hinging the hopper, receptacle and plate to the frame 10, the same may be conveniently emptied of surplus disks by simply turning over the entire hopper, receptacle and plate, as is well understood. If desired, plate 17 may be provided with a plurality of circular or other openings 18 of smaller diameter than the normal diameter of the cork disks to separate chips and broken disks from the mass of the receptacle, the same falling downwardly thru the supporting frame 10. Plate 17, moreover, is preferably made concave over a portion of its face to concentrate the disks toward the center where an outlet tube or opening 19 is provided and of a diameter sufficiently large to pass a single disk.

In order to effect a movement of the disks toward this outlet, the plate is arranged, as by mounting the same to slide in slots 20 of the walls of the receptacle 14, to have a reciprocatory movement in a direction at right angles to the axis of the outlet 19. This may be effected in any suitable manner, for example, by means of an eccentric pin 21, driven thru the pulley 13 and engaging a slotted member 22 attached to the under side of the plate 17. The disks will thereby be moved over the surface of plate 17 toward the outlet 19; and to avoid interference by disks attempting to enter the outlet in a direction other than in the line of movement of the plate, diametrically-opposed members, as, for example pins 23, extend upwardly from the plate and are located in proximity to the said opening in a plane at right angles to the line of movement.

As the disks leave the opening 19, they are received by a suitable chute, for example, a chute 25 provided with an upper stationary funnel member 26 extending over the outlet 19 and of sufficient area at the top to accommodate the reciprocatory motion of the plate 17, the diameter at the bottom of the funnel being the same as that of the chute proper 25, and which is just sufficient to properly accommodate the disks. I prefer, however, in order to avoid misplacement of the disks during the movement of a disk from the end of the outlet 19 to the chute proper 25, to provide means to maintain substantially the correct diameter for the proper location of the disks during this period of their travel. To this end, movable members, for example diametrically-opposed and upwardly-extending spring members 27 are secured to the outside of the chute portion 25 and extend within the interior of the funnel 26 thru vertical slots 28 in the wall of said funnel. The upper ends of these members embrace the outlet 19, and the whole spring members thus partake of the motion of the plate 17 during its reciprocation. The distance between the two spring members is such that the proper diameter for the disks will be substantially maintained, and no misplacement and consequent jamming of the disk can take place.

I claim:

1. In a device of the character described, the combination with a receptacle for a mass of sealing disks of cork or the like; of a movable plate provided with an outlet to discharge said disks; and an outlet chute to receive and stack the same, and consisting of a stationary portion and a movable portion, the latter being adapted to be engaged by said movable plate.

2. In a device of the character described, the combination with a receptacle for a mass of sealing disks of cork or the like; of a movable plate provided with an outlet to discharge said disks; and an outlet chute comprising a stationary portion, a stationary funnel connected therewith and registering with the outlet of said plate, and movable members mounted in said funnel to cooperate with the outlet of said plate.

3. In a device of the character described, the combination with a receptacle for a mass of sealing disks of cork or the like, and having a discharge opening; and an outlet chute comprising a stationary portion, a stationary funnel connected therewith and provided with diametrically opposed vertical slots, and spring members mounted in said funnel opposite said slots; of an intermediate, reciprocatory plate provided with an outlet sufficiently large to pass a disk, said outlet engaging the ends of said spring members.

4. In a device of the character described, the combination with a disk receptacle; a movable plate mounted in said receptacle and provided with an opening sufficiently large to pass a disk; of a frame supporting said receptacle and plate, the latter being hingedly attached to the former; and a chute carried by said frame and registering with said outlet.

5. In a device of the character described, the combination with a disk receptacle and a hopper to deliver disks to said receptacle; a reciprocatory plate mounted in said receptacle and provided with an opening displaced with respect to the outlet of the hopper and sufficiently large to pass a disk; of a frame supporting said receptacle, plate and hopper, the latter being hingedly attached to the former; and a chute carried by said frame and registering with the outlet.

Signed at New York, in the county of New York and State of New York, this 17th day of June, A. D. 1916.

ALEXANDER BOGDÁNFFY.